(12) United States Patent
Wang et al.

(10) Patent No.: US 10,209,459 B2
(45) Date of Patent: Feb. 19, 2019

(54) OPTICAL FIBER CONNECTOR AND ASSEMBLY METHOD THEREFOR

(71) Applicant: ADC Telecommunications (Shanghai) Distribution Co., Ltd., Shanghai (CN)

(72) Inventors: Liming Wang, Shanghai (CN); Guanpeng Hu, Shanghai (CN); Youfeng Lu, Shanghai (CN)

(73) Assignee: COMMSCOPE TELECOMMUNICATIONS (SHANGHAI) CO., LTD., Shanghai (CN)

( * ) Notice: Subject to any disclaimer, the term of this patent is extended or adjusted under 35 U.S.C. 154(b) by 52 days.

(21) Appl. No.: 15/514,387

(22) PCT Filed: Sep. 25, 2015

(86) PCT No.: PCT/CN2015/090718
§ 371 (c)(1),
(2) Date: Aug. 18, 2017

(87) PCT Pub. No.: WO2016/045613
PCT Pub. Date: Mar. 31, 2016

(65) Prior Publication Data
US 2017/0351038 A1    Dec. 7, 2017

(30) Foreign Application Priority Data

Sep. 26, 2014   (CN) .......................... 2014 1 0502692
Sep. 26, 2014   (CN) ..................... 2014 2 0560176 U

(51) Int. Cl.
*G02B 6/38*    (2006.01)
*G02B 6/36*    (2006.01)

(52) U.S. Cl.
CPC ............. *G02B 6/3855* (2013.01); *G02B 6/38* (2013.01); *G02B 6/387* (2013.01); *G02B 6/389* (2013.01);
(Continued)

(58) Field of Classification Search
CPC .... G02B 6/3821; G02B 6/387; G02B 6/3869; G02B 6/3855; G02B 6/3854;
(Continued)

(56) References Cited

U.S. PATENT DOCUMENTS 4,220,394 A    9/1980  Tardy
4,598,974 A    7/1986  Munn et al.
(Continued)

FOREIGN PATENT DOCUMENTS

CN        102156331 A    8/2011
CN        102289037 A    12/2011
(Continued)

OTHER PUBLICATIONS

International Search Report and Written Opinion of the International Searching Authority for International Patent Application No. PCT/CN2015/090718 dated Jan. 11, 2016, 12 pgs.
(Continued)

*Primary Examiner* — Kaveh C Kianni
*Assistant Examiner* — Hung Lam
(74) *Attorney, Agent, or Firm* — Merchant & Gould P.C.

(57) ABSTRACT

The present invention discloses a type of optical fiber connector, comprising: an external shell; an internal shell, installed within said external shell; an inserted core component, contained within said internal shell and comprising an inserted core and a length of optical fiber pre-installed within said inserted core; and a spring, contained within said internal shell and located behind said inserted core, and being for exerting a pre-set axial force on said inserted core.

(Continued)

Said internal shell includes a front part and a rear part; said rear part is assembled on said front part. Additionally, said spring is compressed between said rear part and said inserted core. In the present invention, the rear part can act as a retainer for the compressed spring and can also be for securing the Kevlar fiber extension tube of the optical cable. As a result, in comparison to the prior art, the present invention reduces the number of components of the optical fiber connector and simplifies the structure of the optical fiber connector, thus facilitating rapid on-site assembly of the optical fiber connector.

21 Claims, 7 Drawing Sheets

(52) U.S. Cl.
CPC ......... *G02B 6/3821* (2013.01); *G02B 6/3825* (2013.01); *G02B 6/3846* (2013.01); *G02B 6/3849* (2013.01); *G02B 6/3887* (2013.01)

(58) Field of Classification Search
CPC .. G02B 6/3887; G02B 6/3879; G02B 6/3825; G02B 6/3849; G02B 6/389
USPC ........ 385/53, 55, 60, 62, 70, 72, 78, 80, 81, 385/84, 87, 92, 95
See application file for complete search history.

(56) References Cited

U.S. PATENT DOCUMENTS

| | | | |
|---|---|---|---|
| 4,877,303 A | 10/1989 | Caldwell et al. | |
| 4,920,366 A | 4/1990 | Bowen et al. | |
| 5,040,867 A | 8/1991 | De Jong et al. | |
| 5,748,819 A | 5/1998 | Szentesi et al. | |
| 6,068,410 A | 5/2000 | Giebel et al. | |
| 6,120,193 A | 9/2000 | Luther et al. | |
| 6,152,609 A | 11/2000 | Dzyck et al. | |
| 6,173,097 B1 | 1/2001 | Throckmorton et al. | |
| 6,715,933 B1 | 4/2004 | Zimmer et al. | |
| 7,220,061 B2 | 5/2007 | De Marchi | |
| 7,507,031 B2 | 3/2009 | Kawasaki | |
| 8,043,013 B2 | 10/2011 | Lichoulas et al. | |
| 2002/0076165 A1 | 6/2002 | Childers et al. | |
| 2005/0213890 A1 | 9/2005 | Barnes et al. | |
| 2005/0244108 A1 | 11/2005 | Billman et al. | |
| 2009/0269014 A1* | 10/2009 | Winberg | G02B 6/3846 385/78 |
| 2010/0124394 A1 | 5/2010 | Meek et al. | |
| 2011/0008003 A1 | 1/2011 | Tamekuni et al. | |
| 2011/0097044 A1 | 4/2011 | Saito et al. | |
| 2012/0288238 A1 | 11/2012 | Park et al. | |
| 2015/0117822 A1* | 4/2015 | Hu | G02B 6/3858 385/86 |

FOREIGN PATENT DOCUMENTS

| | | |
|---|---|---|
| CN | 202221486 U | 5/2012 |
| CN | 102981220 A | 3/2013 |
| CN | 103576251 A | 2/2014 |
| CN | 103852828 A | 6/2014 |
| CN | 104062709 A | 9/2014 |
| CN | 204256210 U | 4/2015 |
| EP | 1 126 295 A1 | 8/2001 |
| WO | 2009/011799 A1 | 1/2009 |
| WO | 2013/126429 A1 | 8/2013 |

OTHER PUBLICATIONS

Extended European Search Report for corresponding European Patent Application No. 15844101.4 dated May 11, 2018, 9 pages.

* cited by examiner

OPTICAL FIBER CONNECTOR AND ASSEMBLY METHOD THEREFOR

CROSS-REFERENCE TO RELATED APPLICATIONS

This application is a National Stage Application of PCT/CN2015/090718, filed on 25 Sep. 2015, which claims benefit of Serial No. 201410502692.x, filed in China on 26 Sep. 2014 and Serial No. 201420560176.8, filed with the State Intellectual Property Office in China on 26 Sep. 2014 and which applications are incorporated herein by reference. To the extent appropriate, a claim of priority is made to each of the above disclosed applications.

TECHNICAL FIELD

The present invention relates to a type of optical fibre connector and an on-site method of assembling that optical fibre connector.

BACKGROUND OF THE INVENTION

In the prior art, optical fibre fusion connectors that connect to the ends of optical cables via fusion splicing of optical fibre generally comprise an internal shell, an external shell, an inserted core component, a spring, a spring protector, optical cable securing components, a fusion splice protective sleeve, a strain relief boot and a dust cap. The inserted core component includes an inserted core and a section of pre-installed optical fibre retained within the inserted core. This section of pre-installed optical fibre is for fusion splicing with the incoming optical fibre of the optical cable.

In the prior art, when assembling optical fibre connectors on-site, it is necessary to install the dust cap, inserted core component, spring and spring retainer within the internal shell one-by-one, then to fusion splice the pre-installed optical fibre and the incoming optical fibre of the optical cable together. The fusion splice protective sleeve is then connected with the rear end of the internal shell and the buffer sleeve (this being a component part of the optical cable) of the incoming optical fibre, thus ensuring that the fusion splice between the pre-installed optical fibre and the incoming optical fibre is protected within the protective sleeve. Then the optical cable securing component is installed on the internal shell, with the optical cable Kevlar fibre being secured to the optical cable securing component. Finally, the strain relief boot is installed over the optical cable securing component and the internal shell installed within the external shell.

In the prior art, the optical cable securing component generally includes a relatively long extension tube and a heat shrink tubing/a crimping sleeve. The front end of the extension tube connects to the rear end of the internal shell, and the fusion splice protective sleeve is contained within the extension tube. The optical cable Kevlar fibre is secured to the rear end of the extension tube by heat shrink tubing/a crimping sleeve.

The aforesaid optical fibre connector of the prior art includes a relatively large number of independent components, and has a very complex structure, making it unsuited to rapid on-site installation of optical fibre connectors, for such on-site assembly of optical fibre connectors is very time consuming.

Moreover, in the prior art, the need to use fairly long extension tubes results in excessively long optical fibre connectors and strain relief boots that are too short, which can result in optical cables in optical fibre connectors being damaged easily when subjected to lateral strain. In other words, it reduces the capacity of optical cables to withstand lateral loads.

Apart from this, in the prior art, it is also necessary to use specialised crimping tools to crimp crimping sleeves or strain relief boots onto the rear end of the extension tube, increasing the difficulty of on-site assembly of optical fibre connectors.

SUMMARY OF THE INVENTION

The aim of the present invention is to resolve at least one aspect of the above mentioned problems and defects of the prior art.

One aim of the present invention is to provide a type of optical fibre connector which can be rapidly assembled on-site.

According to one aspect of the present invention, it provides a type of optical fibre connector comprising: an external shell; an internal shell, installed within said external shell; an inserted core component, contained within said internal shell and comprising an inserted core and a length of optical fibre pre-installed within said inserted core; and a spring, contained within said internal shell and being located behind said inserted core, for exerting a pre-set axial force on said inserted core. Said internal shell includes a front part and a rear part, said rear part being assembled on said front part; said spring is compressed between said rear part and said inserted core.

According to one exemplary embodiment of the present invention, said optical fibre connector also includes a temporary retention component, said temporary retention component being capable of assembly on said front part, and being for pre-retaining said inserted core component and said spring in said front part before the rear part is assembled onto the front part. Additionally, in the process of assembling said rear part onto said front part, said temporary retention component automatically drops from said front part.

According to another exemplary embodiment of the present invention, a weak section is formed on said temporary retention component. Additionally, said rear part is constructed in such a way that during the process of the rear part being assembled on the front part, it interferes with the temporary retention component, causing said weak section to break and thus causing the temporary retention component to drop from said front part automatically.

According to another exemplary embodiment of the present invention, said temporary retention component is suitable for fitting over the rear end section of said front part, the front end section of said rear part being suitable for insertion into the rear end section of said front part.

According to another exemplary embodiment of the present invention, there is a raised section formed on the internal wall of said temporary retention component. After the temporary retention component is assembled on said front part, said raised section presses down on the rear end of said spring, thus temporarily retaining said inserted core component and said spring within said front part. There is a recessed positioning section formed on the external wall of the front end section of said rear part which matches and interferes with said raised section and which is for causing the weak section of the temporary retention component to break and for ensuring the correct orientation of said rear part when inserted into said front part.

According to another exemplary embodiment of the present invention, a catch groove is formed on a raised section of said temporary retention component. Additionally, on said rear part there is a raised section formed within the recessed positioning section which matches the catch groove and which is for guiding insertion of said rear part into said temporary retention component.

According to another exemplary embodiment of the present invention, there is a flexible catch formed on said temporary retention component, said flexible catch being suitable for catching in the recess formed on said front part so as to facilitate assembly of said temporary retention component onto said front part.

According to another exemplary embodiment of the present invention, on the front end section of said rear part there is a raised section. Said raised section is suitable for catching in the opening formed on said front part, so as to facilitate assembly of said rear part on said front part.

According to another exemplary embodiment of the present invention, after said rear part is assembled on said front part, a cylindrical front end section of said rear part is fitted over said spring. Additionally, the rear end of said spring is pressed onto the stepped obstructing surface formed on the internal wall of said rear part.

According to another exemplary embodiment of the present invention, said pre-installed optical fibre is for fusion splicing together with the incoming optical fibre of the optical cable connected with said optical fibre connector.

According to another exemplary embodiment of the present invention, the fusion splice between said pre-installed optical fibre and said incoming optical fibre is contained within a protective sleeve. Additionally, the front end of said protective sleeve is connected to the buffer tube encapsulating said pre-installed optical fibre, the rear end being connected to the buffer tube encapsulating said incoming optical fibre.

According to another exemplary embodiment of the present invention, said optical fibre connector also includes a dust cap. Said dust cap is fitted over the front end section of said inserted core in order to protect the pre-installed optical fibre within said inserted core.

According to another exemplary embodiment of the present invention, before said rear part is assembled on said front part, said dust cap, said inserted core component and said spring are retained on said front part by said temporary retention component.

According to another exemplary embodiment of the present invention, said optical cable is an optical cable with Kevlar fibre, and the Kevlar fibre of said optical cable is secured by the heat shrink tubing to the rear end section of the rear part of said internal shell. Additionally, the front end of said heat shrink tubing is heat shrunk onto the rear end section of said rear part, the rear end being heat shrunk onto the external protective cover of said optical cable.

According to another exemplary embodiment of the present invention, said optical cable is an optical cable without Kevlar fibre, and said optical fibre connector also includes heat shrink tubing for securing said optical cable. The front end of said heat shrink tubing is heat shrunk onto the rear end section of said rear part, and the rear end is heat shrunk onto the external protective cover of said optical cable.

According to another exemplary embodiment of the present invention, said optical fibre connector also includes a strain relief boot. The front end of said strain relief boot is fitted over said heat shrink tubing, and the rear end is fitted over the external protective cover of said optical cable.

According to another exemplary embodiment of the present invention, there is a threaded connecting section formed on the rear end section of said rear part. Additionally, the Kevlar fibre of said optical cable is secured on the rear end section of the rear part of said internal shell by being in a threaded connection with a threaded sleeve on the rear end section of said rear part. Additionally, one section of the external protective cover of the front end of said optical cable is cut into two halves and is pressed in between said threaded sleeve and the rear end section of said rear part.

According to another exemplary embodiment of the present invention, there is a conical pressure surface formed on the internal wall of said threaded sleeve. Said conical pressure surface faces the edge of the end surface of the rear end section of said rear part. Additionally, the external protective cover of said optical cable is pressed between the conical pressure surface of said threaded sleeve and the edge of the end surface of the rear end section of said rear part.

According to another exemplary embodiment of the present invention, said optical fibre connector also includes a strain relief boot. The front end of said strain relief boot is fitted over said threaded sleeve, and the rear end is fitted over the external protective cover of said optical cable.

According to another aspect of the present invention, it provides a method for assembly of the aforesaid optical fibre connector, comprising the following steps:

S100: the inserted core component and spring are pre-retained within said front part; and, S200: said rear part is assembled within said front part, resulting in said spring being compressed between said rear part and said inserted core.

According to an exemplary embodiment of the present invention, said inserted core component and spring are pre-retained within said front part by installing a temporary retention component on said front part.

According to another exemplary embodiment of the present invention, in the process of assembling said rear part onto said front part, said temporary retention component automatically drops from said front part.

According to another exemplary embodiment of the present invention, a weak section is formed on said temporary retention component. Additionally, said rear part is constructed in such a way that during the process of the rear part being assembled on the front part, it interferes with the temporary retention component, causing said weak section to break and causing said temporary retention component to drop from said front part automatically.

According to another exemplary embodiment of the present invention, said temporary retention component is suitable for fitting over the rear end section of said front part, the front end section of said rear part being suitable for insertion into the rear end section of said front part.

According to another exemplary embodiment of the present invention, there is a raised section formed on the internal wall of said temporary retention component. After the temporary retention component is assembled on said front part, said raised section presses down on the rear end of said spring, thus temporarily retaining said inserted core component and said spring within said front part. Additionally, there is a recessed positioning section formed on the external wall of the front end section of said rear part which matches and interferes with said raised section and which is for causing the weak section of the temporary retention component to break and for ensuring the correct orientation of said rear part when inserted into said front part.

According to another exemplary embodiment of the present invention, a catch groove is formed on a raised section of said temporary retention component. Additionally, on said rear part there is a raised section formed within the recessed positioning section which matches the catch groove and which is for guiding insertion of said rear part into said temporary retention component.

According to another exemplary embodiment of the present invention, there is a flexible catch formed on said temporary retention component. Said flexible catch is suitable for catching in the recess on said front part so as to facilitate assembly of said temporary retention component onto said front part.

According to another exemplary embodiment of the present invention, on the front end section of said rear part there is a raised section. Said raised section is suitable for catching in the opening formed on said front part so as to facilitate assembly of said rear part on said front part.

According to another exemplary embodiment of the present invention, after said rear part is assembled on said front part, a cylindrical front end section of said rear part is fitted over the spring. Additionally, the rear end of said spring is pressed onto the stepped obstructing surface formed on the internal wall of said rear part.

According to another exemplary embodiment of the present invention, said optical fibre connector also includes a dust cap. Said dust cap is fitted over the front end section of said inserted core in order to protect the pre-installed optical fibre within said inserted core.

According to another embodiment of the present invention, before said rear part is assembled on said front part, said dust cap, said inserted core component and said spring are pre-retained in said front part by said temporary retention component.

According to another exemplary embodiment of the present invention, the previously mentioned method further includes a step: after the inserted core component and spring have been pre-retained within said front part and before said rear part has been assembled on said front part, the incoming optical fibre of said optical cable is fusion spliced with said pre-installed optical fibre.

According to another exemplary embodiment of the present invention, the previously mentioned method further includes a step: prior to assembly of said rear part within said front part, the two ends of the protective sleeve are connected respectively with the buffer tubing of said incoming optical fibre and said pre-installed optical fibre, ensuring that the fusion splice between said incoming optical fibre and said pre-installed optical fibre is contained within said protective sleeve.

According to another exemplary embodiment of the present invention, the optical cable is an optical cable with Kevlar fibre, and the Kevlar fibre of said optical cable is secured by the heat shrink tubing to the rear end section of the rear part of said internal shell. Additionally, the front end of said heat shrink tubing is heat shrunk onto the rear end section of said rear part, and the rear end is heat shrunk onto the external protective cover of said optical cable.

According to another exemplary embodiment of the present invention, said optical cable is an optical cable without Kevlar fibre, and said optical fibre connector also includes heat shrink tubing for securing said optical cable. The front end of said heat shrink tubing is heat shrunk onto the rear end section of said rear part, and the rear end is heat shrunk onto the external protective cover of said optical cable.

According to another exemplary embodiment of the present invention, the previously mentioned method further includes a step: the strain relief boot is fitted over said heat shrink tubing and external protective cover of said optical cable, and said internal shell is installed within said external shell.

According to another exemplary embodiment of the present invention, there is a threaded connecting section formed on the rear end section of said rear part. Additionally, the Kevlar fibre of said optical cable is secured on the rear end section of the rear part of said internal shell by being in a threaded connection with a threaded sleeve on the rear end section of said rear part. Additionally, one section of the external protective cover of the front end of said optical cable is cut into two halves and is pressed in between said threaded sleeve and the rear end section of said rear part.

According to another exemplary embodiment of the present invention, there is a conical pressure surface formed on the internal wall of said threaded sleeve. Said conical pressure surface faces the edge of the end surface of the rear end section of the rear part. Additionally, the external protective cover of said optical cable is pressed between the conical pressure surface of said threaded sleeve and the edge of the end surface of the rear end section of said rear part.

According to another exemplary embodiment of the present invention, the previously mentioned method further includes a step: the strain relief boot is fitted over said threaded sleeve and external protective cover of said optical cable, and said internal shell is installed within said external shell.

In the optical fibre connector of all embodiments of the present invention, the internal shell is separated into two parts, a front part and a rear part. The rear part may serve as a retainer for the compressed spring and may be used to secure the optical cable Kevlar fibre extension tube. Therefore, compared to the prior art, the present invention reduces the number of components of the optical fibre connector and simplifies the structure of the optical fibre connector, thus facilitating rapid on-site assembly of the optical fibre connector.

In addition, in the optical fibre connector of all embodiments of the present invention, the extension tube of the prior art is omitted. As a result, the overall length of the optical fibre connector of to the present invention is shorter, while the strain relief boot is longer, thus increasing the capacity of the optical cable connecting to the optical fibre connector to withstand lateral loads.

In addition, in the optical fibre connector of all embodiments of the present invention, there is no need to use any specialised tool when carrying out on-site assembly of the optical fibre connector. The difficulty of on-site assembly of the optical fibre connector is thus reduced.

The descriptions of the present invention in the following text taken in conjunction with the drawings clarify other objectives and advantages of the present invention, and may be of assistance in gaining a full understanding of the present invention.

DRAWINGS

FIG. 1 presents an exploded view of a first exemplary embodiment of the optical fibre connector according to the present invention, the external shell not being shown here;

FIG. 2 is a representation of a pre-installed part formed by pre-assembling the dust cap, inserted core component and spring in FIG. 1 within the front part of the internal shell using a temporary retention component;

FIG. 3 presents a cut-away view of the pre-installed part in FIG. 2;

SPECIFIC EMBODIMENTS

Figure 1:
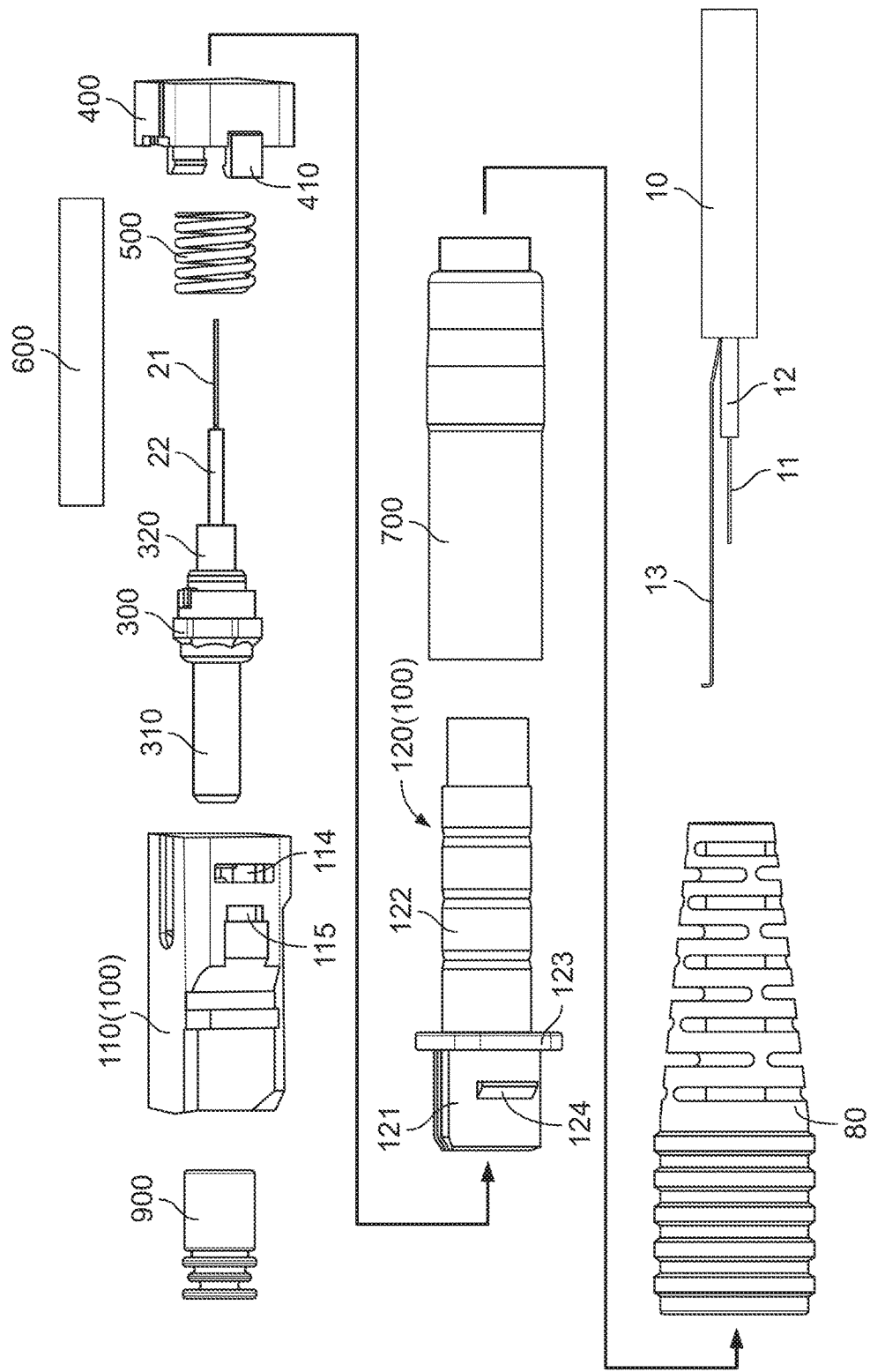

The following embodiments, taken in conjunction with the drawings, provide a more detailed description of the technical schemes of the present invention. Within the description, numbering that is the same or similar in the drawings refers to components that are the same or similar. The aim of the following description of implementations of the present invention taken in conjunction with the drawings are to aid in the interpretation of the overall inventive conceptual framework of the present invention, and should not be understood as restricting the present invention in any way.

In addition, in the following detailed descriptions, for convenience of interpretation, many specific details are provided in order to allow a full understanding of the embodiments disclosed. However, it should be clear that one or more embodiment could be implemented without these specific details. In all other cases, structures and devices which are common knowledge are represented graphically to allow simplification of the drawings.

According to an overall technical concept of the present invention, it provides an optical fibre connector comprising: an external shell; an internal shell, installed within said external shell; an inserted core component, contained within said internal shell and comprising an inserted core and a length of optical fibre pre-installed within said inserted core; and a spring, contained within said internal shell and being located behind said inserted core, for exerting a pre-set axial force on said inserted core. Said internal shell includes a front part and a rear part, said rear part being assembled on said front part; said spring is compressed between said rear part and said inserted core.

Embodiment 1

FIG. 1 is an exploded view of the first exemplary embodiment of the optical fibre connector according to the present invention, the external shell 200 not being shown here.

As is shown in FIG. 1, in an exemplary embodiment of the present invention, the optical fibre connector mainly includes an internal shell 100, an external shell 200, an inserted core component, a spring 500, heat shrink tubing 700 and a strain relief boot 800.

Figure 10:
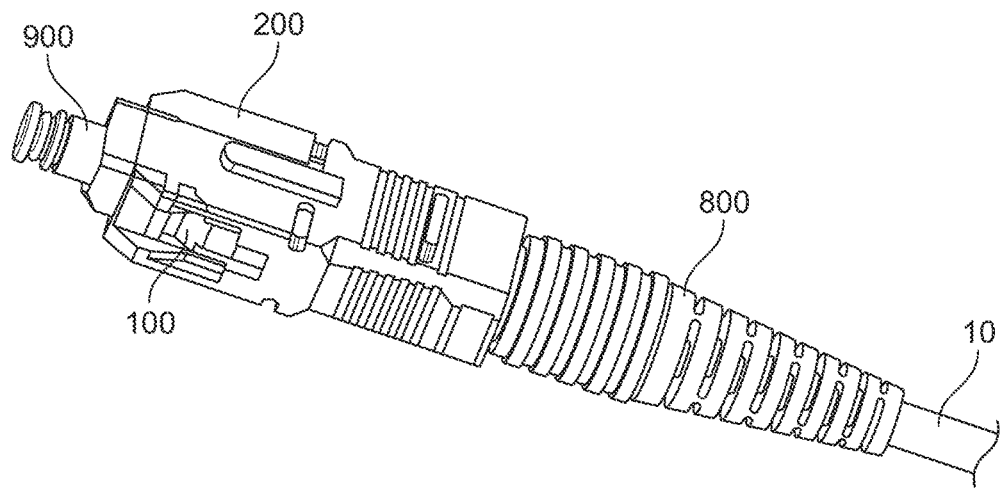
FIG. 10 is a representation of the complete optical fibre connector resulting from installing the strain relief boot over the heat shrink tubing and optical cable and installing the internal shell within the external shell.
Figure 11:
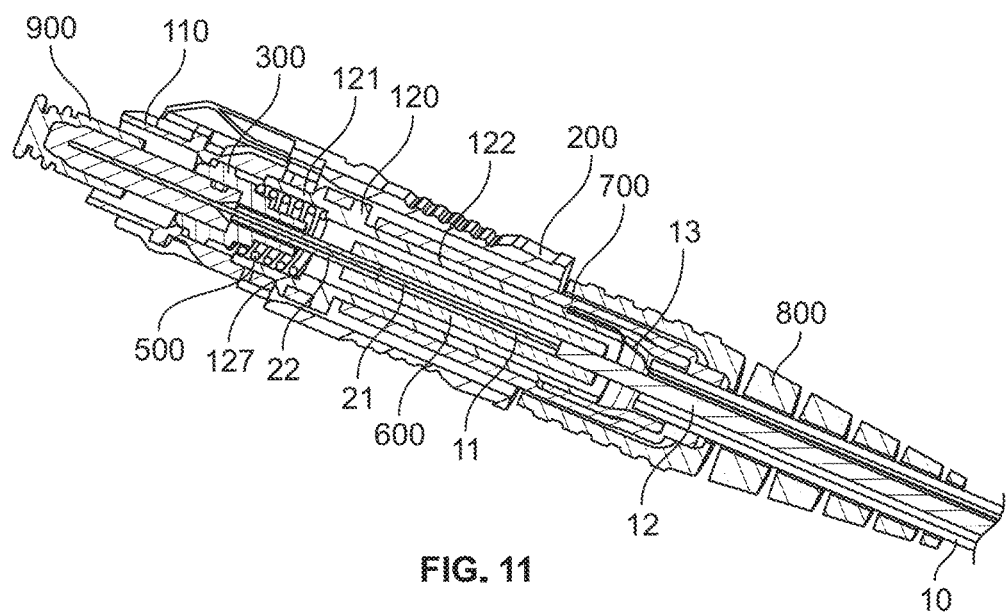
FIG. 11 is a cut-away view of the optical fibre connector shown in FIG. 10.

FIG. 10 is a representation of the complete optical fibre connector resulting from installing the strain relief boot 800 over the heat shrink tubing 700 and optical cable 10 and installing the internal shell 100 within the external shell 200;

FIG. 11 is a cut-away view of the optical fibre connector in FIG. 10.

In the embodiment represented in FIG. 1, FIG. 10 and FIG. 11, the inserted core component is contained within the internal shell 100, and the inserted core component includes an inserted core 300 and a length of pre-installed optical fibre 21 within the inserted core 300. In the embodiment depicted in the drawing, the rear end of the pre-installed optical fibre 21 extends out of the rear end section 320 of the inserted core 300 in order to facilitate fusion splicing with the incoming optical fibre 11 of the optical cable 10.

In the embodiment represented in FIG. 1, FIG. 10 and FIG. 11, a spring 500, contained within the internal shell 100 and located behind the inserted core 300, is for exerting a pre-set axial force on the inserted core 300.

With further reference to FIG. 1, FIG. 10 and FIG. 11, in an exemplary embodiment of the present invention, the internal shell 100 includes a front part 110 and a rear part 120, the rear part 120 being capable of being assembled on the front part 110. After the rear part 120 has been assembled on the front part 110, the spring 500 is compressed between the rear part 120 and the inserted core 300.

In the embodiment represented in FIG. 1, FIG. 10 and FIG. 11, the optical cable 10 connected to the optical fibre connector possesses Kevlar fibre (a strengthening component) 13, and that Kevlar fibre 13 is secured to the rear end section 122 of the rear part 120.

Figure 2:
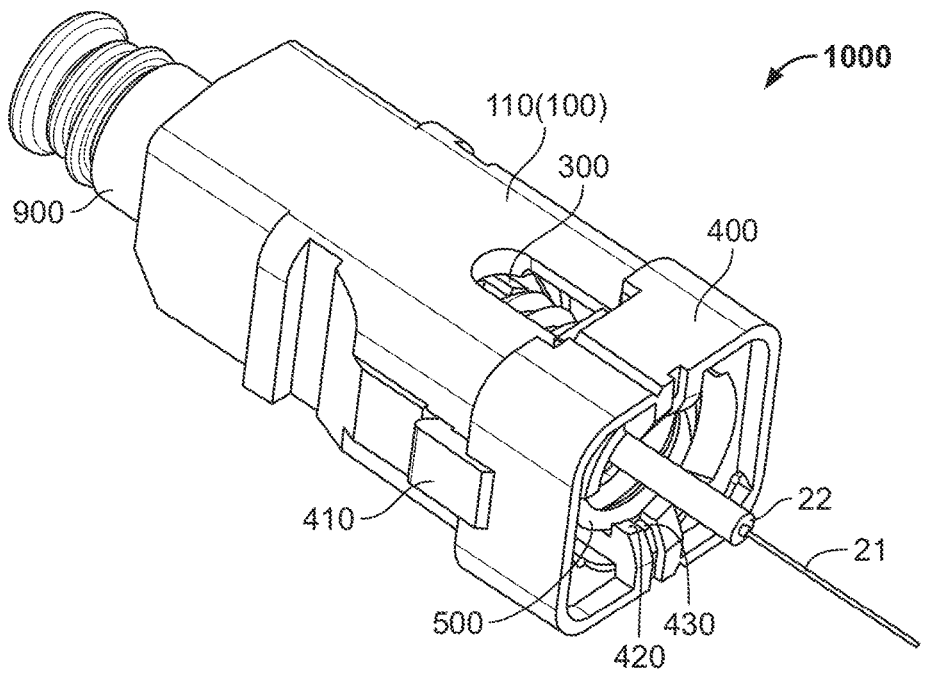
Figure 3:
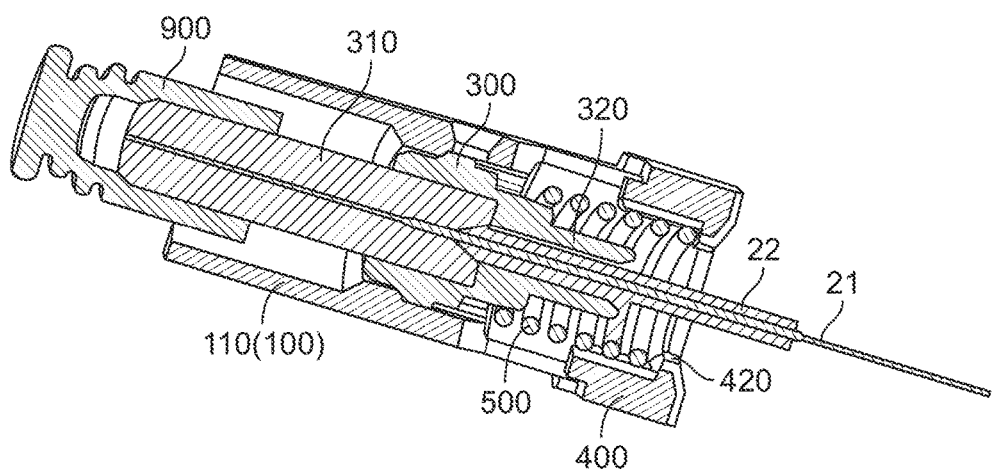

FIG. 2 is a representation of a pre-installed part 1000 formed of the front part 110 pre-assembled from the dust cap 900, inserted core component and spring 500 in FIG. 1 in the internal shell 100 using a temporary retention component; FIG. 3 is a cut-away view of the pre-installed part 1000 in FIG. 2.

In the exemplary embodiment represented in FIG. 1, FIG. 2 and FIG. 3, the optical fibre connector may also include a temporary retention component 400. The temporary retention component 400 is capable of assembly on the front part 110 and is for pre-retaining the inserted core component and spring 500 in the front part 110 before the rear part 120 is assembled on the front part 110.

In an exemplary embodiment of the present invention, the temporary retention component 400 is constructed in such a way that during the process of assembling the rear part 120 on the front part 110 it drops from the front part 110 automatically.

Figure 4:
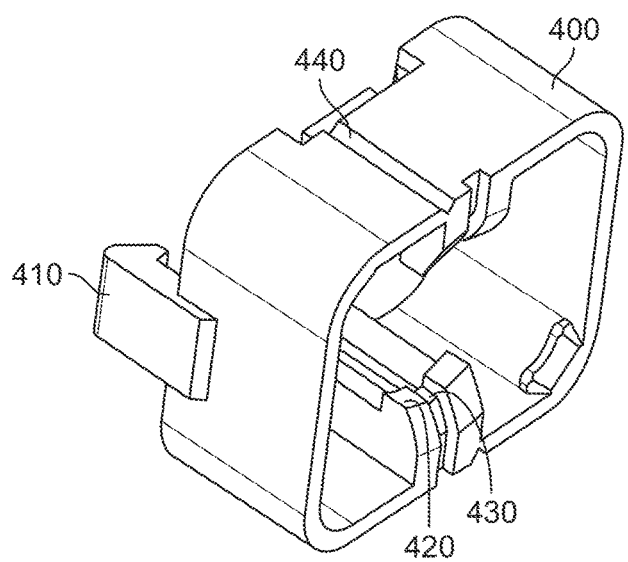
FIG. 4 is a magnified representation of the temporary retention component in FIG. 1.
Figure 5:
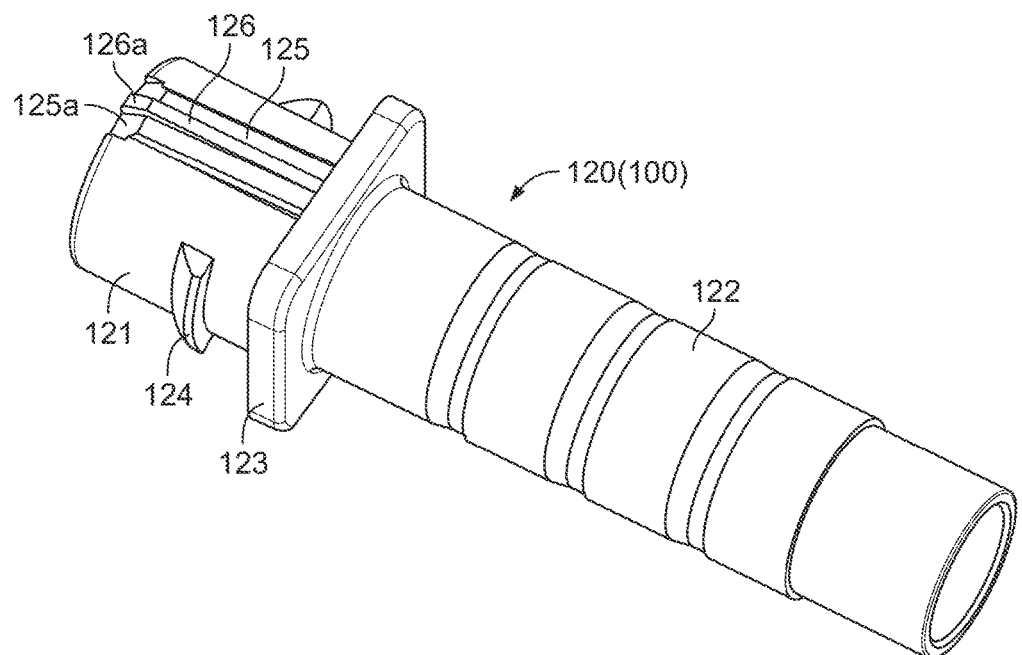
FIG. 5 is a magnified representation of the rear part of the internal shell in FIG. 1.

FIG. 4 is a magnified representation of the temporary retention component 400 in FIG. 1; FIG. 5 is a magnified representation of the rear part 120 of the internal shell 100 in FIG. 1.

In the embodiment graphically represented in FIG. 4 and FIG. 5, a weak section 440, e.g., a thin wall section, a cut section or section that can be easily broken in some other way, is formed on the temporary retention component 400.

The rear part 120 is constructed in such a way that, during the process of assembling the rear part 120 on the front part 110, it interferes with the temporary retention component 400, causing the weak section 440 to break and causing the temporary retention component 400 to drop from the front part 110 automatically.

In the embodiment represented in FIG. 2 and FIG. 3, the temporary retention component 400 is suitable for fitting over the rear end section of the front part 110, and the front end section 121 of the rear part 120 is suitable for insertion into the rear end section of the front part 110.

As shown in FIGS. 2 through 5, in an exemplary embodiment of the present invention, there is a raised section 420 formed on the internal wall of the temporary retention component 400. After the temporary retention component 400 is assembled on the front part 110, the raised section 420 presses down on the rear end of the spring 500, temporarily retaining the inserted core component and spring 500 within the front part 110. Additionally, there is a recessed positioning section 125 formed on the external wall of the front end section 121 of the rear part 120 which matches and interferes with the raised section 420 and which is for causing the weak section 440 of the temporary retention component 400 to break and ensuring the correct orientation of the rear part 120 when inserted into the front part 110.

In an exemplary embodiment of the present invention, as indicated in FIG. 2 to FIG. 5, a catch groove 430 is formed on the raised section 420 of the temporary retention component 400. Additionally, on the rear part 120 there is a raised section 126 formed within the recessed positioning section 125 which matches the catch groove 430 and which is for guiding insertion of the rear part 120 into the temporary retention component 400.

In the depicted embodiment, when the front end section 121 of the rear part 120 is inserted into the temporary retention component 400, the raised section 420 of the temporary retention component 400 matches and interferes with the recessed positioning section 125 of the rear part 120, causing the temporary retention component 400 to gradually expand outwards, and causing the weak section 440 on the temporary retention component 400 to break.

In addition, in the depicted embodiment, in order to facilitate insertion of the front end section 121 of the rear part 120 into the temporary retention component 400, there are angled guide surfaces 125a and 126a formed on the recessed positioning section 125 of the rear part 120 and on the front end of the raised section 126, respectively.

In an exemplary embodiment of the present invention, as represented in FIGS. 1 through 5, there is a flexible catch 410 formed on the temporary retention component 400. The flexible catch 410 is for catching in the recess 115 on the front part 110 in order to facilitate assembly of the temporary retention component 400 onto the front part 110.

In an exemplary embodiment of the present invention, as represented in FIGS. 1 through 5, on the front end section 121 of the rear part 120 there is a raised section 124. The raised section 124 is suitable for catching in the opening 114 formed on the front part 110 in order to facilitate assembly of the rear part 120 on the front part 110.

In the embodiment graphically represented in FIG. 10 and FIG. 11, after the rear part 120 is assembled on the front part 110, the cylindrical front end section 121 of the rear part 120 is fitted over the spring 500. Additionally, the rear end of the spring 500 is pressed onto the stepped obstructing surface 127 formed on the internal wall of the rear part 120.

In the embodiment depicted in the drawings, in order to prevent the rear part 120 from being inserted into the front part 110 too far, there is a raised edge section 123 on the rear part 120. The raised edge section 123 is located between the front end section 121 and rear end section 122 of the rear part 120. When the rear part 120 is inserted into the front part 110, the raised edge section 123 comes to rest against the wall of the rear end of the front part 110, thus preventing the rear part 120 from being inserted too far into the front part 110.

Figure 6:
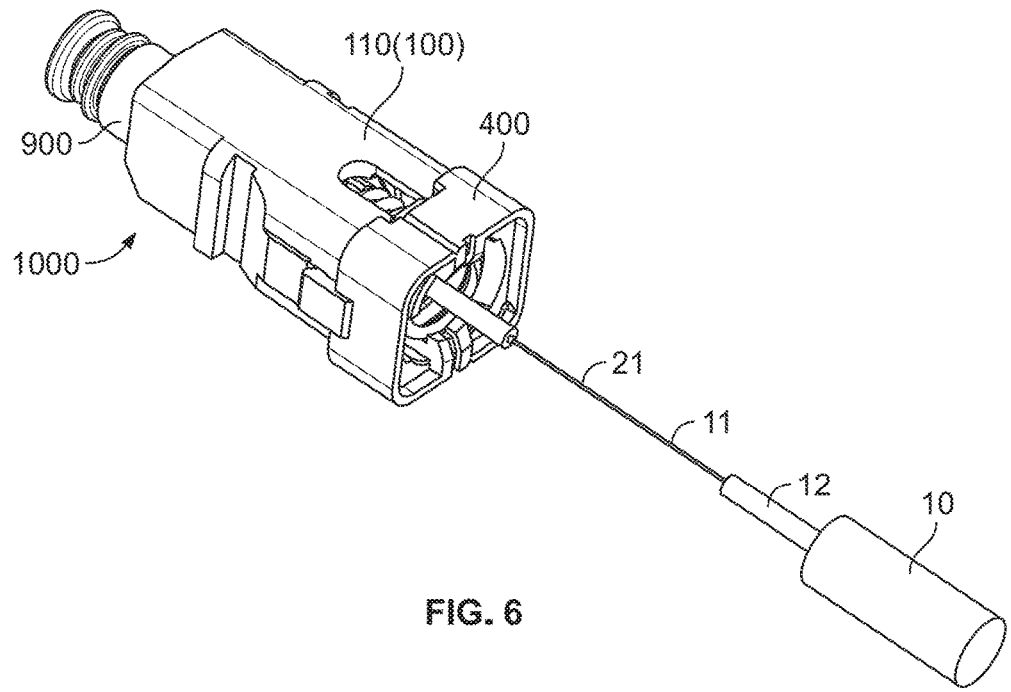
FIG. 6 is a representation of the pre-installed optical fibre and the incoming optical fibre of the optical cable fusion spliced together after the pre-assembled part in FIG. 2 has been formed.
Figure 7:
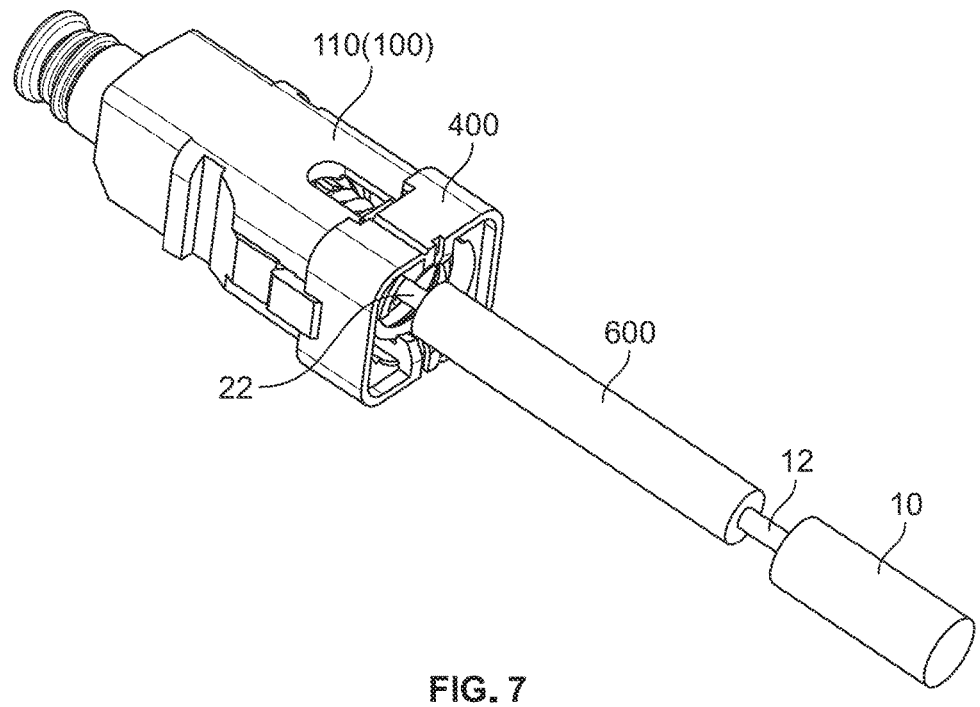
FIG. 7 is a representation of the protective sleeve the two ends of which have been separately joined to the buffer tubing of the pre-installed optical fibre and the incoming optical fibre after the pre-installed optical fibre and incoming optical fibre have been fusion spliced together.

FIG. 6 is a representation of the pre-installed optical fibre 21 and the incoming optical fibre 11 of the optical cable 10 fusion spliced together after the pre-assembled part 1000 in FIG. 2 has been assembled. FIG. 7 is a representation of the protective sleeve 600 the two ends of which have been joined to the buffer tubing 22 and 12 of the pre-installed optical fibre 21 and incoming optical fibre 11, after the pre-installed optical fibre 21 and incoming optical fibre 11 have been fusion spliced together.

As shown in FIG. 6, FIG. 7, FIG. 10 and FIG. 11, the fusion splice between the pre-installed optical fibre 21 and the incoming optical fibre 11 is located within a protective sleeve 600. Additionally, the front end of the protective sleeve 600 is connected to the buffer tube 22 encapsulating the pre-installed optical fibre 21, and the rear end is connected to the buffer tube 12 encapsulating the incoming optical fibre 11 in an embodiment of the present invention, the protective sleeve 600 may be heat shrink tubing or cold shrink tubing.

In the embodiment graphically represented in FIG. 1 through FIG. 3, the optical fibre connector also includes a dust cap 900. The dust cap 900 is fitted over the front end section 310 of the inserted core 300 in order to protect the pre-installed optical fibre 21 within the inserted core 300.

In the exemplary embodiment of the present invention represented in FIG. 2 and FIG. 3, before the rear part 120 is assembled on the front part 110, the dust cap 900, inserted core component and spring 500 are retained on the front part 110 by the temporary retention component 400.

Figure 8:
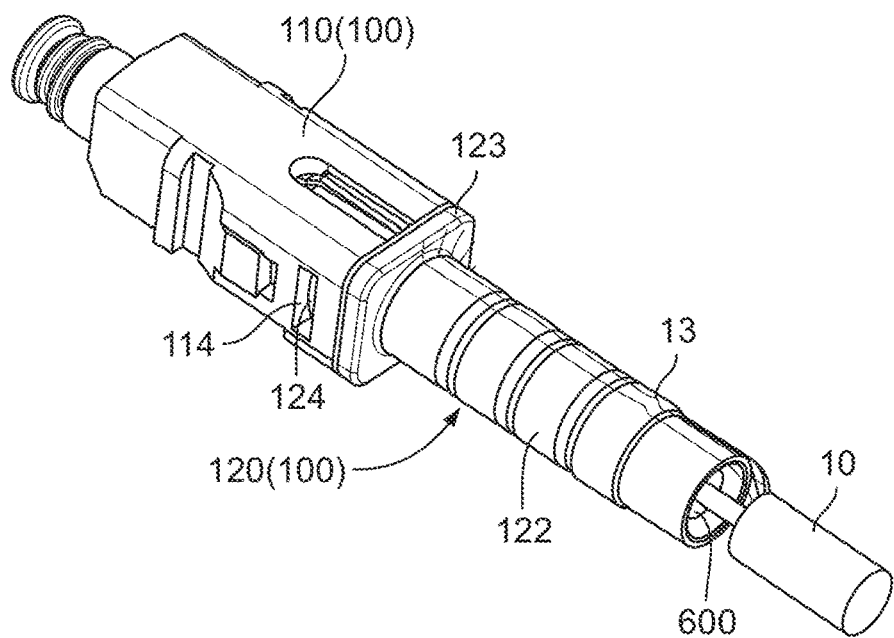
FIG. 8 is a representation of the rear part of the internal shell inserted into the front part, and the Kevlar fibre of the optical cable placed on the rear end section of the rear part.
Figure 9:
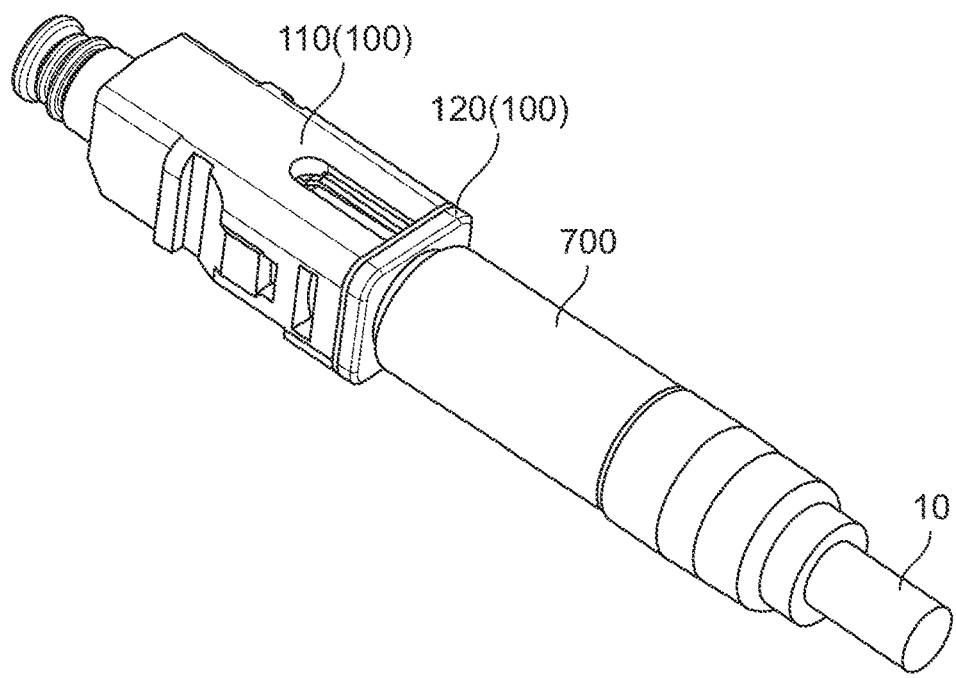
FIG. 9 is a representation of the heat shrink tubing heat shrunk onto the rear end section of the rear part of the internal shell and the optical cable.

FIG. 8 is a representation of the rear part 120 of the internal shell 100 inserted into the front part 110, and the Kevlar fibre 13 of the optical cable 10 placed on the rear end section 122 of the rear part 120. FIG. 9 is a representation of the heat shrink tubing 700 heat shrunk onto the rear end section 122 of the rear part 120 of the internal shell 100 and the optical cable 10.

In the exemplary embodiment of the present invention graphically represented in FIG. 8, FIG. 9, FIG. 10 and FIG. 11, the Kevlar fibre 13 of the optical cable 10 is secured to the rear end section 122 of the rear part 120 of the internal shell 100 by heat shrink tubing 700. The front end of the heat shrink tubing 700 is heat shrunk onto the rear end section 122 of the rear part 120 and is for securing the Kevlar fibre 13 of the optical cable 10 on the rear end section 122 of the rear part 120 of the internal shell 100. The rear end of the heat shrink tubing 700 is heat shrunk onto the external protective cover of the optical cable 10.

In the embodiment graphically represented in FIG. 10 and FIG. 11, the front end of the strain relief boot 800 is installed over the heat shrink tubing 700, and the rear end of the strain relief boot 800 is installed over the external protective cover of the optical cable 10.

The following taken in conjunction with FIG. 1 through FIG. 11 provides a detailed description of the assembly process of the optical fibre connector of an exemplary embodiment of the present invention.

Firstly, as shown in FIG. 2 and FIG. 3, the temporary retention component 400 is used to pre-retain the dust cap 900, the inserted core component and spring 500 within the front part 110 of the internal shell 100, forming the pre-installed part 1000. It should be noted that this pre-installed part 1000 can be completed at the factory, and does not require on-site assembly, thus reducing the amount of work required by the on-site assembly of the optical fibre connector.

Subsequently, as shown in FIG. 6, the pre-installed optical fibre 21 and the incoming optical fibre 11 of the optical cable 10 are fusion spliced together.

Subsequently, as shown in FIG. 7, the two ends of the protective sleeve 600 are connected respectively with the buffer tubing 12 and 22 of the incoming optical fibre 11 and the pre-installed optical fibre 21, ensuring that the fusion splice between the incoming optical fibre 11 and the pre-installed optical fibre 21 is contained within the protective sleeve 600.

Subsequently, as shown in FIG. 8, the rear part 120 of the internal shell 100 is assembled within the front part 110, resulting in the spring 500 being compressed between rear part 120 and the inserted core 300 and also causing the temporary retention component 400 to break and automatically drop off the front part 110.

Subsequently, as shown in FIG. 9, the heat shrink tubing 700 is heat shrunk onto the rear end section 122 of the rear part 120 and the external protective cover of the optical cable 10, thus securing the Kevlar fibre 13 of the optical cable 10 on the rear end section 122 of the rear part 120 of the internal shell 100.

Finally, as shown in FIG. 10 and FIG. 11, the strain relief boot 800 is installed over the heat shrink tubing 700 and the external protective cover of the optical cable 10, and the internal shell 100 is installed within the external shell 200, thus completing the assembly of the whole optical fibre connector.

In the embodiment shown in FIGS. 1 through 11, the optical cable 10 connected to the optical fibre connector is an optical cable which possesses Kevlar fibre 13. However, the present invention is not restricted to the embodiment diagrammatically represented here, and the optical cable connected to the optical fibre connector may also be optical cable without Kevlar fibre, e.g., "FIG. of 8" optical cable. However, where this type of optical cable is concerned, the optical fibre and the buffer tubing encapsulating the optical fibre may not move relative to the external protective cover of the optical cable. As a result, it is necessary to leave a fairly long section of buffer tubing exposed on the optical cable. When optical fibre connectors are used in this manner (the front end of the inserted core becomes compressed), the relatively long section of exposed optical cable buffer tubing can easily become bent, causing the inserted core to move slightly. Thus, the optical fibre connector cannot produce [sic] additional insertion loss because of the bending, nor can it prevent breakage of the optical cable under extreme circumstances.

Embodiment 2

Figure 12:
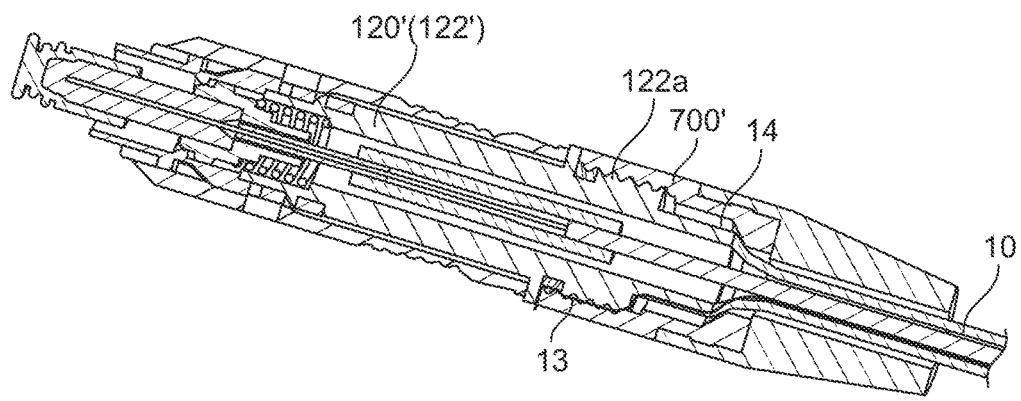
FIG. 12 is a cut-away view of the optical fibre connector according to exemplary embodiment 2 of the present invention, the external shell not being shown here.
Figure 13:
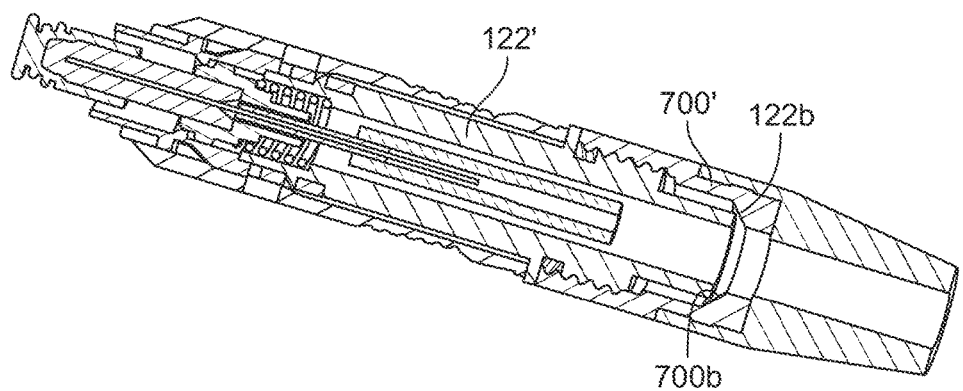
FIG. 13 is a cut-away view of the optical fibre connector shown in FIG. 12, neither the external shell nor the optical cable being shown here.

FIG. 12 is a cut-away view of the optical fibre connector according to exemplary embodiment 2 of the present invention (the external shell not being shown here), and FIG. 13 is a cut-away view of the optical fibre connector shown in FIG. 12 (neither the external shell or optical cable being shown here).

The main difference between the optical fibre connector of embodiment 2 shown in FIGS. 12 and 13 and the optical fibre connector of embodiment 1 shown in FIGS. 1 through 11 is the securing structure used to secure the Kevlar fibre of the optical cable. Otherwise, the optical fibre connector of embodiment 2 shown in FIGS. 12 and 13 and the optical fibre connector of embodiment 1 shown in FIGS. 1 through 11 are identical, and for the sake of brevity, the following only provides a description of areas in which embodiment 1 and embodiment 2 differ.

In the exemplary embodiment represented in FIG. 12 and FIG. 13, there is a threaded connecting section 122a formed on the rear end section 122' of the rear part 120' of the internal shell. The Kevlar fibre 13 of the optical cable 10 is secured on the rear end section 122' of the rear part 120' of the internal shell by being in a threaded connection with a threaded sleeve 700' on the rear end section 122' of the rear part 120'. The front end of a section of external protective cover 14 of the optical cable 10 is cut in two halves, and is pressed between the rear end section 122' of the rear part 120' and the threaded sleeve 700'.

In the embodiment graphically represented in FIG. 12 and FIG. 13, there is a conical pressure surface 700b formed on the internal wall of the threaded sleeve 700'. The conical pressure surface 700b faces the edge 122b of the end surface of the rear end section 122' of the rear part 120'. Additionally, the external protective cover 14 of the optical cable 10 is pressed between the conical pressure surface 700b of the threaded sleeve 700' and the edge 122b of the end surface of the rear end section 122' of the rear part 120'.

In embodiment 2 shown in FIG. 12 and FIG. 13, after the threaded sleeve 700' is in a threaded connection with the rear end section 122' of the rear part 120' of the internal shell, the strain relief boot 800' is installed over the threaded sleeve 700' and the external protective cover of the optical cable 10.

Although the present invention has been described in conjunction with the drawings, the objective of the embodiments disclosed by the drawings is purely to provide illustrative descriptions of preferred implementations of the present invention, and should not be understood as constituting any kind of restriction on the present invention.

Although some embodiments of the overall concepts of the present invention have been displayed and described, a person of ordinary skill in the art would be able to make various modifications to these embodiments which do not depart from the principles and spirit embodied by the concepts of the present invention. The scope of the present invention is defined by the claims and their equivalents.

It should be understood that, the word "including" or "comprising" does not exclude other components or steps, and the word "a", "an" or "one" does not exclude more than one. In addition, the labelling of any component in the claims should not be understood as restricting the scope of the present invention in any way.

The invention claimed is:
1. An optical fibre connector, comprising:
an external shell;
an internal shell installed within said external shell;
a core component contained within said internal shell and comprising a core and a section of optical fibre pre-installed within said core; and
a spring contained within said internal shell and located behind said core for exerting a pre-set axial force on said core,
wherein said internal shell comprises a front part and a rear part, said rear part adapted for assembly on said front part;
wherein said spring is compressed between said rear part and said core when said rear part is assembled to said front part;

wherein said optical fibre connector further comprises a temporary retention component adapted for assembly on said front part, and for pre-retaining said core component and said spring within said front part before the rear part is assembled on the front part; and wherein the temporary retention component is adapted to disassemble from the front part when the rear part is assembled to the front part.

2. The optical fibre connector of claim 1:

wherein said temporary retention component includes a weak section; and wherein said rear part is adapted, when assembling the rear part on the front part, to interfere with the temporary retention component, causing said weak section to break and causing said temporary retention component to detach from said front part.

3. The optical fibre connector of claim 2:

wherein said temporary retention component is adapted for fitting over the rear section of said front part, a cylindrical front end section of said rear part being adapted for insertion into the rear section of said front part.

4. The optical fibre connector of claim 3:

wherein said temporary retention component includes an internal wall having a raised section, the raised section being adapted to press on a rear end of said spring to temporarily retain said core component and said spring within said front part; and wherein a recessed positioning section on an external wall of the front end section of said rear part matches and interferes with said raised section, the recessed positioning section being adapted to cause the weak section of said temporary retention component to break and to provide a correct orientation of said rear part when inserted into said front part.

5. The optical fibre connector of claim 4:

wherein the raised section of said temporary retention component includes a catch groove; and wherein said rear part includes a raised section within the recessed positioning section which corresponds to said catch groove and is adapted for guiding insertion of said rear part into said temporary retention component.

6. The optical fibre connector of claim 5:

wherein said temporary retention component includes a flexible catch, said flexible catch being adapted to catch in a recess on said front part so as to facilitate assembly of said temporary retention component on said front part.

7. The optical fibre connector of claim 6:

wherein the front end section of said rear part includes a raised section, said raised section being adapted to catch in the opening of said front part so as to facilitate assembly of rear part on said front part.

8. The optical fibre connector of claim 7:

wherein when said rear part is assembled on said front part, the cylindrical front end section of said rear part is fitted over said spring; and wherein the rear end of said spring is pressed onto a stepped obstructing surface on an internal wall of said rear part.

9. The optical fibre connector of claim 1:

wherein said pre-installed optical fibre is adapted to be fused with an incoming optical fibre from an optical cable connected to said optical fibre connector.

10. The optical fibre connector of claim 9:

wherein a fusion splice is provided between said pre-installed optical fibre and said incoming optical fibre, the fusion splice being located within a protective sleeve; and wherein a front end of the protective sleeve is connected to a buffer tube encapsulating said pre-installed optical fibre.

11. The optical fibre connector of claim 10:

wherein said optical fibre connector further comprises a dust cap, said dust cap being fitted over a front end section of said core and adapted to protect the pre-installed optical fibre within said core.

12. The optical fibre connector of claim 11:

wherein before said rear part is assembled on said front part, said temporary retention component pre-retains said dust cap, said core component and said spring in said front part.

13. The optical fibre connector of claim 12:

wherein said optical cable is an optical cable with Kevlar fibre, and wherein the Kevlar fibre of said optical cable is secured by heat shrink tubing; and wherein a front end of said heat shrink tubing is heat shrunk onto the rear end section of said rear part, a rear end of said heat shrink tubing being heat shrunk onto an external protective cover of said optical cable.

14. The optical fibre connector of claim 12:

wherein said optical cable is an optical cable without Kevlar fibre, and wherein said optical fibre connector further comprises heat shrink tubing for securing said optical cable, a front end of said heat shrink tubing being heat shrunk onto the rear end section of said rear part, a rear end of said heat shrink tubing being heat shrunk onto an external protective cover of said optical cable.

15. The optical fibre connector according of claim 13:

wherein said optical fibre connector further comprises a strain relief boot, a front end of said strain relief boot being adapted to fit over said heat shrink tubing, and a rear end of said strain relief boot being adapted to fit over the external protective cover of said optical cable.

16. The optical fibre connector of claim 12:

wherein a rear end section of said rear part includes a threaded connection section, wherein a Kevlar fibre of said optical cable is adapted to be secured on the rear end section of the rear part of said internal shell in a threaded connection with a threaded sleeve on the rear end section of said rear part, and wherein a front end of one section of an external protective cover of said optical cable includes two halves, between which are pressed said threaded sleeve and the rear end section of said rear part.

17. The optical fibre connector of claim 16:

wherein an internal wall of the threaded sleeve includes a conical pressure surface facing an edge of an end surface of the rear end section of said rear part; and wherein the external protective cover of said optical cable is pressed between the conical pressure surface and the edge of the end surface of the rear end section of said rear part.

18. The optical fibre connector of claim 16:

wherein said optical fibre connector further comprises a strain relief boot, a front end of said strain relief boot being adapted to fit over said threaded sleeve, and a rear end of said strain relief boot being adapted to fit over the external protective cover of said optical cable.

19. The optical fibre connector of claim 1, wherein said temporary retention component is adapted to fall way from the front part when assembling the rear part and the front part together.

20. An optical fibre connector assembly, comprising:
an external shell;
an internal shell adapted to be installed within the external shell, the internal shell including a front part adapted to be assembled to a rear part;
a core component comprising a core and a section of optical fibre installed within the core;
a spring for exerting a pre-set axial force on the core; and
a temporary retention component adapted to be assembled to the front part of the internal shell to retain the core component and the spring within the front part before the rear part is assembled to the front part and;
wherein the temporary retention component is adapted to disassemble from the front part when the rear part is assembled to the front part.

21. An optical fiber connector, comprising:
an external shell;
an internal shell installed within the external shell, the internal shell having a front part;
a core component positioned within said internal shell and comprising a core and a section of optical fibre installed within the core;
a spring for exerting a pre-set axial force on the core; and
a temporary retention component assembled to the front part of the internal shell to retain the core component and the spring within the front part;
wherein the temporary retention component includes a weak section, and the temporary retention component is adapted to disassemble from the front part of the internal shell when the weak section receives a front end section of a rear part, and
wherein the front part of the internal shell is adapted for assembly with the rear part.

* * * * *